(12) United States Patent
Cho et al.

(10) Patent No.: US 8,274,721 B2
(45) Date of Patent: Sep. 25, 2012

(54) VARIABLE VIEW IMAGING SYSTEM WITH COMBINATION OF TELECENTRIC SCANNER AND DOUBLE WEDGE PRISMS

(75) Inventors: Hyungsuck Cho, Taejon (KR);
Xiaodong Tao, Taejon (KR)

(73) Assignee: Korea Advanced Institute of Science and Technology (Kaist), Daejeon (KR)

( * ) Notice: Subject to any disclaimer, the term of this patent is extended or adjusted under 35 U.S.C. 154(b) by 589 days.

(21) Appl. No.: 12/396,836

(22) Filed: Mar. 3, 2009

(65) Prior Publication Data
US 2010/0202030 A1 Aug. 12, 2010

(30) Foreign Application Priority Data
Feb. 9, 2009 (KR) .................. 10-2009-0010154

(51) Int. Cl.
*G02B 5/04* (2006.01)
*G02B 26/08* (2006.01)
(52) U.S. Cl. .................. 359/205.1; 359/211.1; 359/663; 359/831
(58) Field of Classification Search .... 359/201.1–202.1, 359/205.1, 368, 380, 656, 663, 831, 900, 359/211.1–211.5
See application file for complete search history.

(56) References Cited

U.S. PATENT DOCUMENTS

| | | | | | |
|---|---|---|---|---|---|
| 3,881,802 | A | * | 5/1975 | Helava | 359/211.1 |
| 5,002,364 | A | * | 3/1991 | Steenblik | 359/15 |
| 5,512,741 | A | * | 4/1996 | Levaillant et al. | 250/203.3 |
| 5,680,200 | A | * | 10/1997 | Sugaya et al. | 355/53 |
| 5,729,383 | A | * | 3/1998 | Chastang et al. | 359/385 |
| 6,560,013 | B1 | * | 5/2003 | Ramsbottom | 359/431 |
| 7,256,934 | B2 | * | 8/2007 | Bihr et al. | 359/431 |
| 7,742,213 | B2 | * | 6/2010 | Potsaid et al. | 359/212.1 |
| 2007/0253057 | A1 | | 11/2007 | Potsaid et al. | |
| 2010/0097680 | A1 | * | 4/2010 | Naftali et al. | 359/205.1 |

OTHER PUBLICATIONS

A Flexible Experimental System for Complex Microassembly under Microscale Force and Vision-Based Control; Hui Xie et al.; Robotics Institute, Harbin Institute of Technology, Harbin, People's Republic of China; *International Journal of Optomechatronics*; Jan. 1, 2007; pp. 81-102.

* cited by examiner

*Primary Examiner* — Frank Font
(74) *Attorney, Agent, or Firm* — Rabin & Berdo, PC

(57) ABSTRACT

A variable view imaging system for observation of micro object with variable view orientation and position includes a telecentric lens group, a scanning mirror, wedge prisms, a deformable mirror and related optical elements. The combination of a scanning mirror and a telecentric lens group decouples the motion of scanning mirror and the view angle. The view angle is determined only by the angle of the wedge prisms. This design increases the zenith angle of the view and simplifies the kinematics of the system. The wedge prisms and the scanning mirror can supply a flexible view in a compact way. The wavefront error induced by the wedge prisms is corrected by the deformable mirror. In order to achieve the desired view state during operation, the scanning mirror angle and the wedge prisms angle are calculated iteratively based on the kinematics and Jacobian matrix of system.

14 Claims, 11 Drawing Sheets

(a)

(b)

(a)        (b)        (c)

(a)

(b)

(c)

(d)

(e)

(f)

VARIABLE VIEW IMAGING SYSTEM WITH COMBINATION OF TELECENTRIC SCANNER AND DOUBLE WEDGE PRISMS

CROSS-REFERENCE TO RELATED APPLICATION

This application claims priority to Korean patent application No. 10-2009-0010154, filed on Feb. 9, 2009, and all the benefits accruing therefrom under 35 U.S.C. §119, the contents of which in its entirety are herein incorporated by reference.

BACKGROUND

1. Field

The present invention relates to an imaging system for observation of micro objects with variable view and a method thereof, and more specifically to an imaging system for observation of three-dimensional micro objects and dynamic micro objects with variable zenith angle, azimuth angle and position of view and an operation method thereof capable of steering view parameters by controlling active optical elements, such as a scanning mirror, wedge prisms and a deformable mirror.

2. Description of the Related Art

With the development of the micro-electro-mechanical systems (MEMS) and biotechnology, there is a growing interest in observation of dynamic targets in three-dimensional (3D) space. However it is still very difficult due to many reasons. One of the important reasons is insufficient vision information using the traditional vision system with fixed optical parameters. Occlusion, low depth resolution and small field of view (FOV) are three main difficulties. In occlusion case, some important features are occluded by the object itself or other objects. Low depth resolution refers to the low reservability along the depth direction. The small FOV issue often occurs when the workspace is larger than the FOV of the optical system. Keeping the region of interest (ROI) on a moving target from the best view direction is critical for observation. Especially for the cases of microassembly and micromanipulation, the two-directional interaction between a micromanipulator/microrobot and a vision system is an important factor for the success of these applications. The vision system must adjust its optical parameters corresponding to the variation of the observed targets.

Although multiple fixed microscopes (Probst, M., Vollmers, K., Kratochvil, B. E. and Nelson, B. J., "Design of an Advanced Microassembly System for the Automated Assembly of Bio-Microrobots," presented at 5th International Workshop on Microfactories, Besancon, France, 25-27, 2006) and moving stages (Hui, X., Weibin, R. and Lining, S. "A Flexible Experimental System for Complex Microassembly under Microscale Force and Vision-based Control," *Int. J. Optomechatronics* 1, 81-102, 2007) are often applied, they are not suitable for general applications. Such approaches do not provide sufficient flexibility and calibrations for different configurations are required. With moving stages, both the manipulation and assembly systems need to be installed on the stage and move together to change the FOV. This also generates agitation in the specimen. Therefore, development of a smart vision system with adjustable optical parameters by integration of optical and robotics technologies will be a promising solution.

As one of these technologies, U.S. Patent Publication No. US 2007/0253057 A1, discloses "Adaptive-Scanning Optical Microscope (ASOM)", which can steer a sub field of view in a large area through the integration of a scanning mirror and a scanning lens group. The wavefront error induced by the scanning lens group is corrected by a deformable mirror. It can be considered as a two degrees-of-freedom active optical system which has a variable view position.

Another active optical system was proposed, which can interact with the environment by changing optical system parameters such as the view position and orientation with four degrees-of-freedom in a compact manner (Korean Patent Application No. 10-0839871, "Variable View Active Optical System and Control of Deformable Mirror Surface Image for the Same", Jun. 13, 2008). The system integrates a pair of wedge prisms, a scanning mirror, a deformable mirror and off-the-shelf optical elements. However, because of the coupling effect between the scanning mirror angle and view angle, the view angle also varies when the scanning mirror operates, which decreases the zenith angle of view and makes the kinematics complex. Because of the coupled Jacobian matrix, the singularity of Jacobian is difficult to identify. The numerical inverse kinematics algorithm is difficult to achieve a solution when the system is near the singularity configuration. The coupled design also makes the calibration of system difficult. The position error between the scanning mirror and the wedge prisms will cause a large error in view state.

SUMMARY

In Korean Patent Application No. 10-0839871, because of the coupling effect between the scanning mirror angle and view angle, the view angle varies when the scanning mirror operates, which decreases the zenith angle of view and makes the kinematics complex. Because of the coupled Jacobian matrix, the singularity of Jacobian is difficult to identify. The numerical inverse kinematics algorithm is difficult to achieve a solution when the system is near the singularity configuration. The coupled design also makes the calibration of system difficult. The position error between the scanning mirror and the wedge prisms will cause a large error in view state.

In order to solve those problems, the present invention combines a telecentric scanner in the system, which can keep light ray before the scanner lens always parallel to the optical axis. Therefore the view angle will be kept constant when the scanning mirror operates. In this case, the zenith angle and azimuth angle of view only relate to the angle of prisms, which decouples the system kinematics.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the disclosed exemplary embodiments will be more apparent from the following detailed description taken in conjunction with the accompanying drawings in which:

FIG. 10(a) is the image from top view, FIG. 10(b) is the image from the system with coupled design, and FIG. 10(c) is the image from the system for the present invention;

FIG. 12(a) shows the microassembly task, and FIG. 12(b)-(f) show the images captured during microassembly.

DETAILED DESCRIPTION

Figure 1:
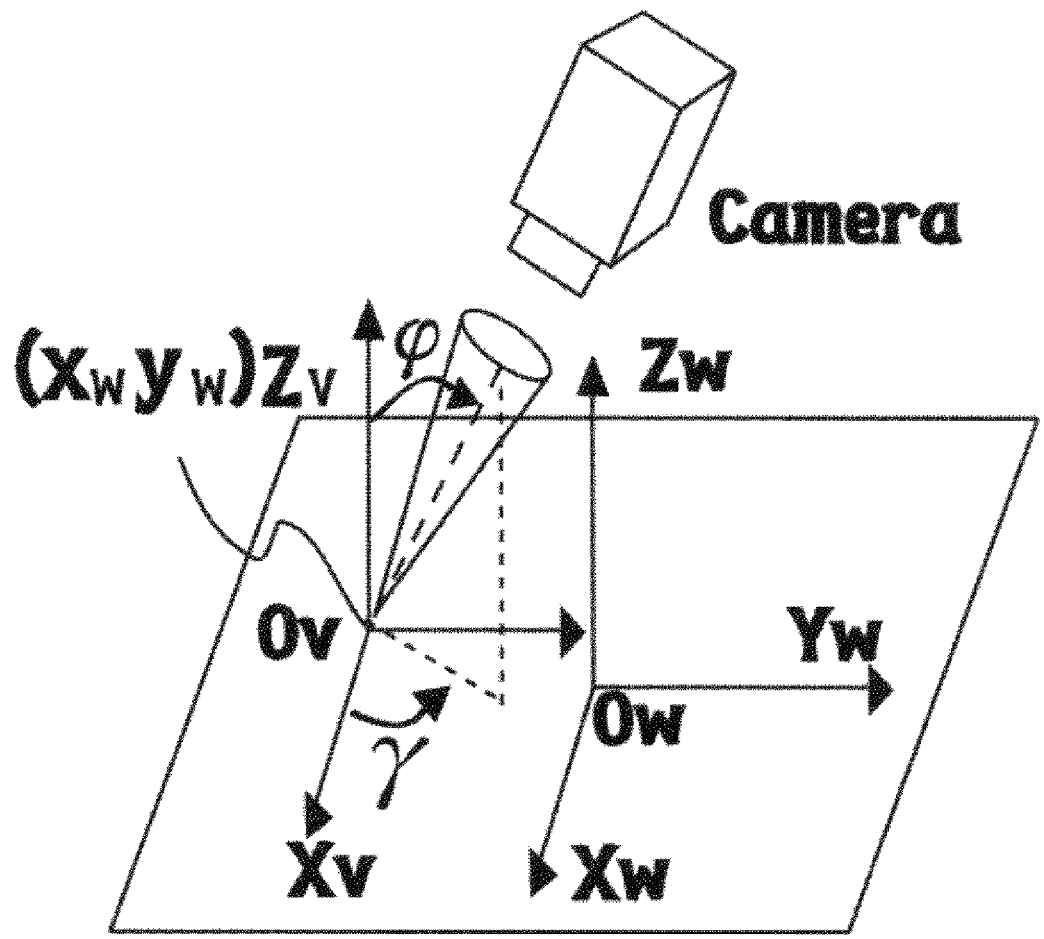
FIG. 1 shows the definition of the work space of the variable image system.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

From a robotics standpoint, the variable view image system can be realized by a camera-robot system with eye-in-hand configuration, where a camera is mounted on a robot's end effector. As shown in the FIG. 1, the view state can be defined as a vector:

$$V = [x_w, y_w, \gamma, \phi]^T \quad (1)$$

Figure 2:
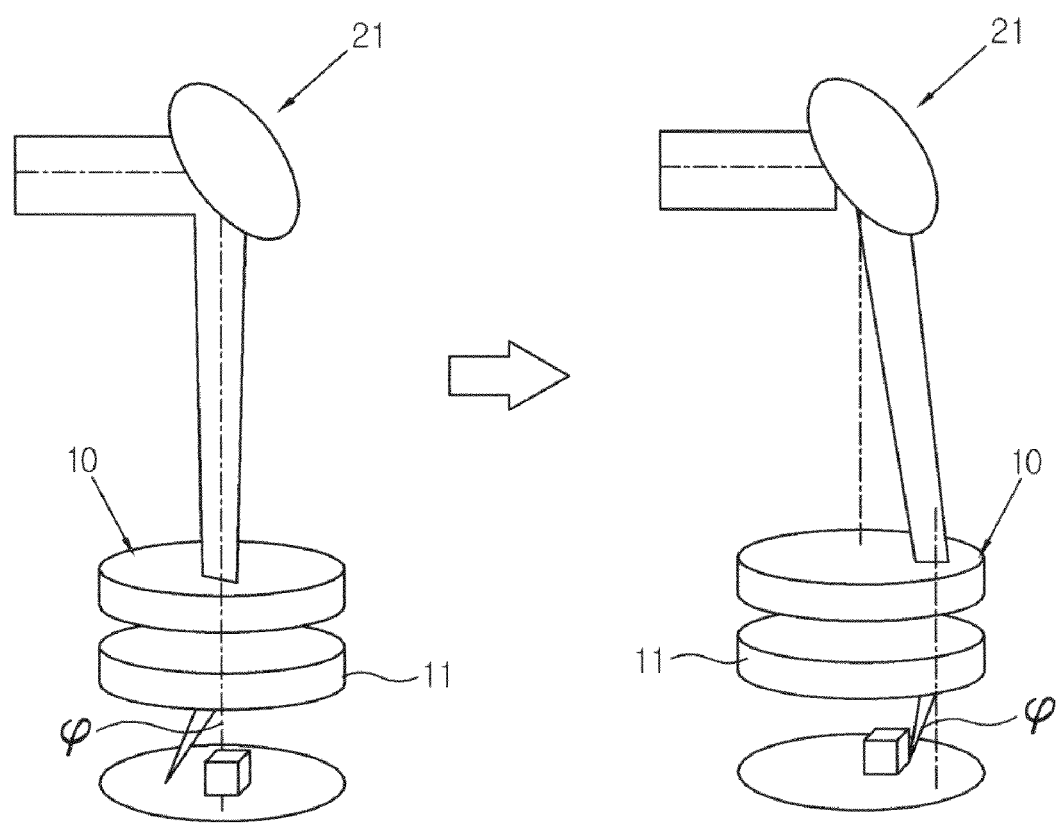
FIG. 2 shows the coupling effects between the scanning mirror motion and zenith angle of view.

Here, $(x_w, y_w)$ is the view position. The view orientation $(\gamma, \phi)$ is composed of the azimuth angle $\gamma$ and the zenith angle $\phi$. The world coordinate frame $O_w X_w Y_w Z_w$ and the local coordinate frame $O_v X_v Y_v Z_v$ are defined, as shown in FIG. 1. In the world coordinate frame, the $X_w Y_w$ plane is located at the object plane of the system. The local coordinate frame $O_v X_v Y_v Z_v$ is fixed on the observed target. The azimuth angle $\gamma$ and zenith angle $\phi$ are defined with respect to the local coordinate frame $O_v X_v Y_v Z_v$. In Korean Patent Application No. 10-0839871, the rotation angle of the scanning mirror 21 and view angle are coupled as shown in FIG. 2. The zenith angle decrease in order to observe the object in the center of the object plane.

Figure 3:
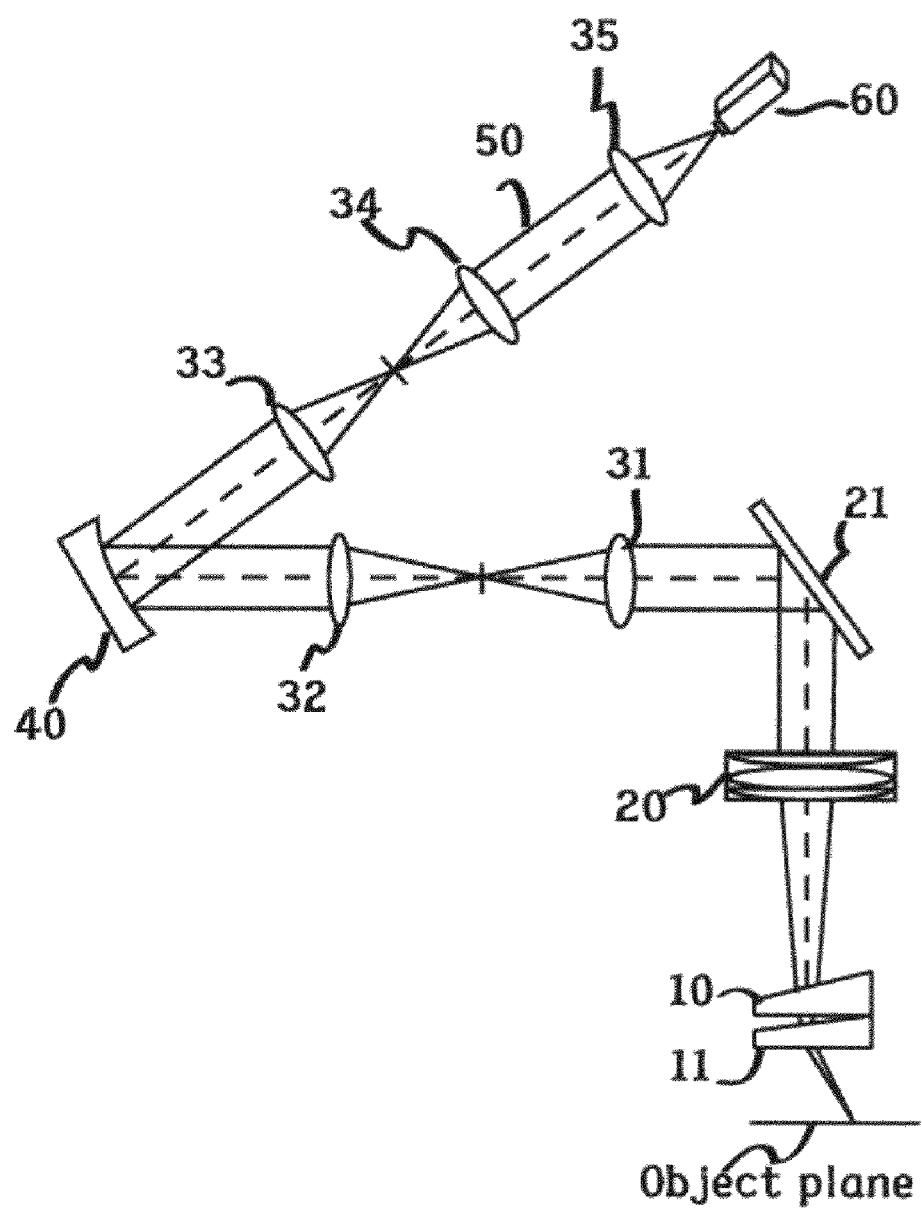
FIG. 3 is the layout of the present invention.
Figure 4:
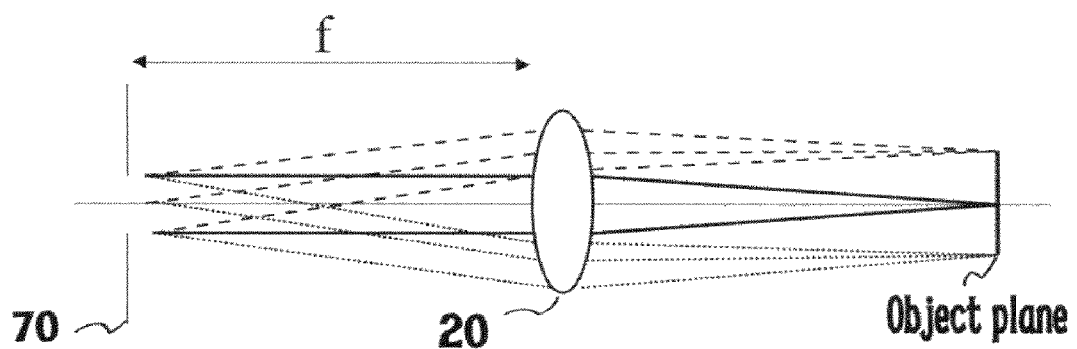
FIG. 4 shows the concept of the telecentric lens.

To decouple the rotation angle of the scanning mirror and view angles, a telecentric scanner is designed and introduced to the system, which includes a two axis scanning mirror 21 and a telecentric lens group 20. The system layout is shown in FIG. 3. The view position can be steered by the telecentric scanner. The view direction can be steered by double wedge prisms 10 and 11. A first intermediate image is formed by a first imaging optical element 31. Optical elements 32 and 33 integrate a deformable mirror 40 into the system. The deformable mirror 40 is used for correction of aberration induced by the wedge prisms. The optical elements 34 and 33 relay the active aperture of the deformable mirror to the system aperture. A final imaging optical element 35 forms a final image on the image sensor 60. The concept of the telecentric system is shown in FIG. 4, where the telecentric lens group is simplified as a lens 20. A stop 70 is located at the focal point of the telecentric lens. It makes an entrance pupil infinitely. Therefore in the object side, the chief rays are always parallel to the optical axis. When the telecentric lens is integrated to the system, the scanning mirror is located at the focal point of the telecentric lens. The azimuth angle and zenith angle of view are only related to the rotation angle of the prisms.

Figure 5:
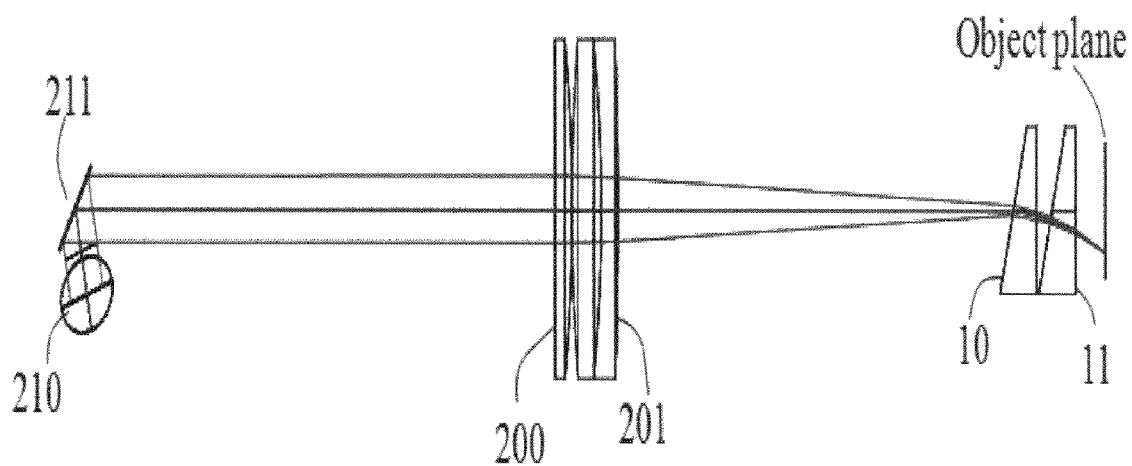
FIG. 5 is the design result of the scanning system including scanning mirror, telecentric lens group and wedge prisms.
Figure 6:
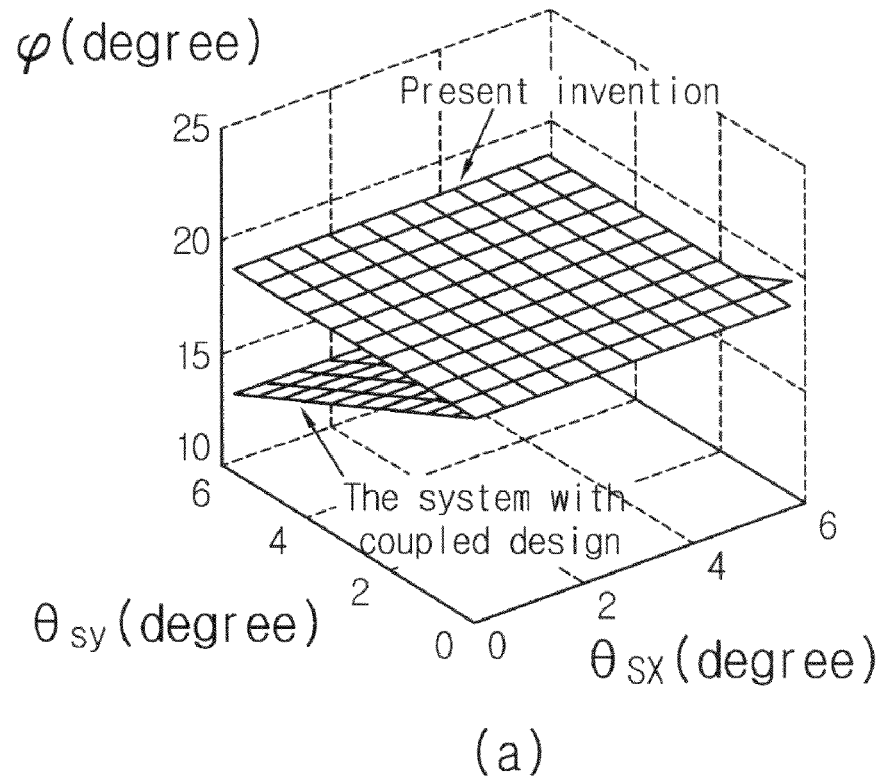
FIG. 6 shows the variation of view orientation with the change of scanning angle for the present invention and the system with coupled design disclosed in Korean Patent Application No. 10-0839871.
Figure 6:
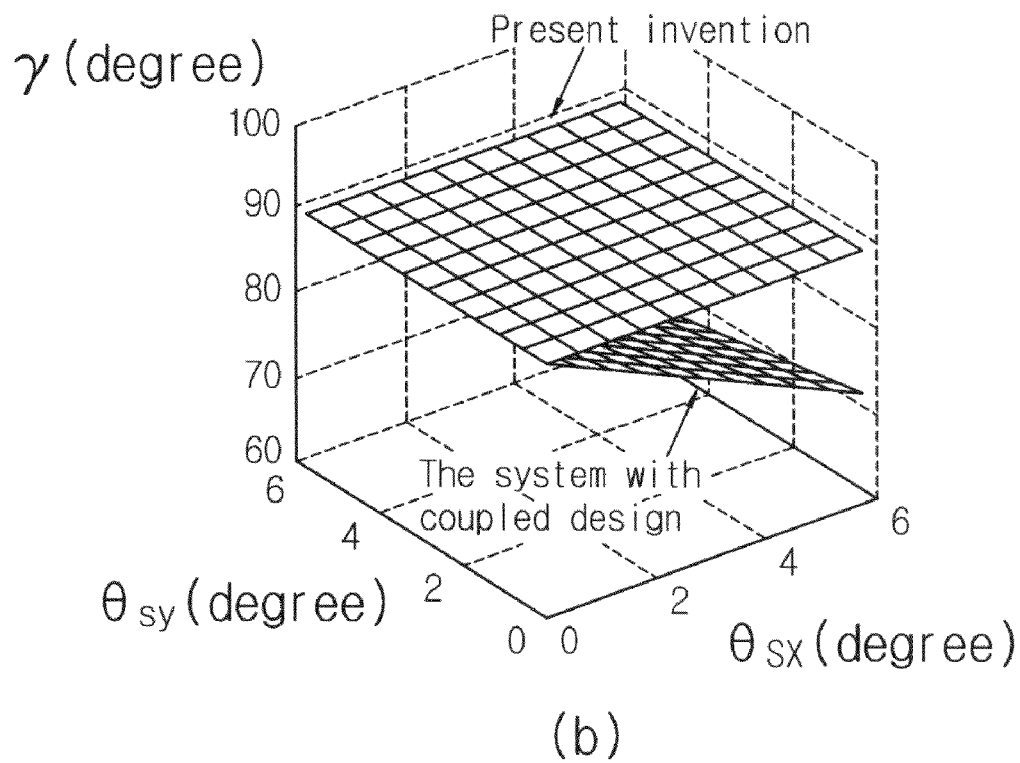

The telecentric scanner is designed separately from the whole system. A preliminary design for the experiment setup is shown in FIG. 5. Diffraction limit is achieved in the design. A two axis scanner includes an X axis scanning mirror 210 and a Y axis scanning mirror 211. A telecentric lens group consists of two lenses, a plano-convex lens 200 and an achromatic doublet lens 201. The maximum peak-valley wavefront error of the whole system including wedge prisms is less than 2.6 $\lambda$ ($\lambda$=660 nm). The zenith and azimuth variation with the change of the scanning mirror angle when $\theta_{p1} = \theta_{p2} = -90°$ is shown in FIGS. 6(a) and (b). As can be seen, the zenith angle $\phi$ equals 18.9°. The azimuth angle $\gamma$ equals 90°. The motion of the scanning mirror and view orientation are decoupled. And a larger zenith angle is achieved.

Figure 7:
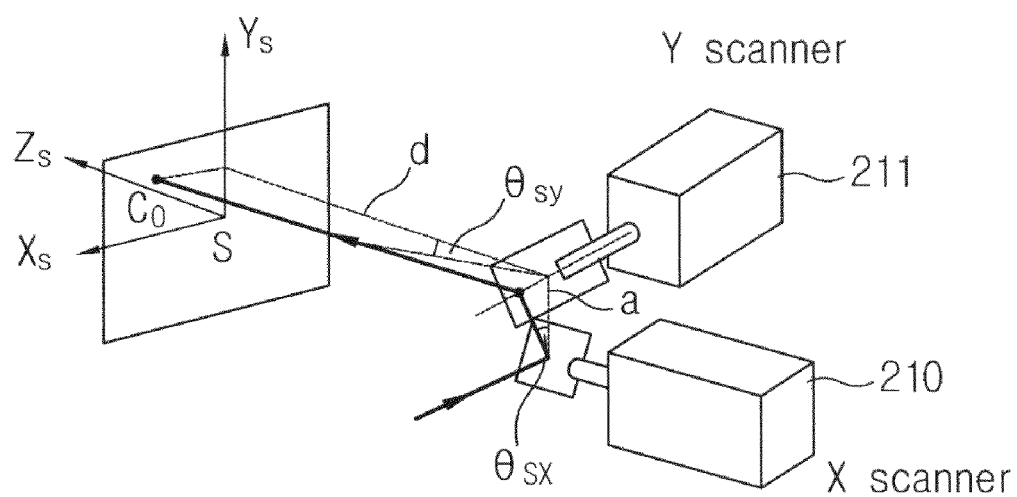
FIG. 7 is the configuration of the two axis scanning mirror.

During the operation of the system, the angle of wedge prism and scanning mirror can be determined based on the kinematics and Jacobian matrix of the system. The kinematics of the system can be defined as:

$$\begin{bmatrix} x_w \\ y_w \\ \gamma \\ \varphi \end{bmatrix} = \begin{bmatrix} f_x(\theta_{sx}, \theta_{sy}, \theta_{p1}, \theta_{p2}) \\ f_y(\theta_{sx}, \theta_{sy}, \theta_{p1}, \theta_{p2}) \\ f_\gamma(\theta_{p1}, \theta_{p2}) \\ f_\varphi(\theta_{p1}, \theta_{p2}) \end{bmatrix} \quad (2)$$

where $(x_w, y_w, \phi, \lambda)$ is the vector for work space variables. The position $(x_s, y_s)$ of ray after the telecentric lens group can be defined by the following equations:

$$x_s = d \tan(\theta_{sx}) / \cos(\theta_{sy}) + a \tan(\theta_{sx})$$

$$y_s = d \tan(\theta_{sy}) \quad (3)$$

where d is the distance between the principal plane of the telecentric lens group and the Y scanning mirror 211. a is the distance between the two mirrors. The configuration of two mirror scanning system is shown in FIG. 7.

Figure 8:
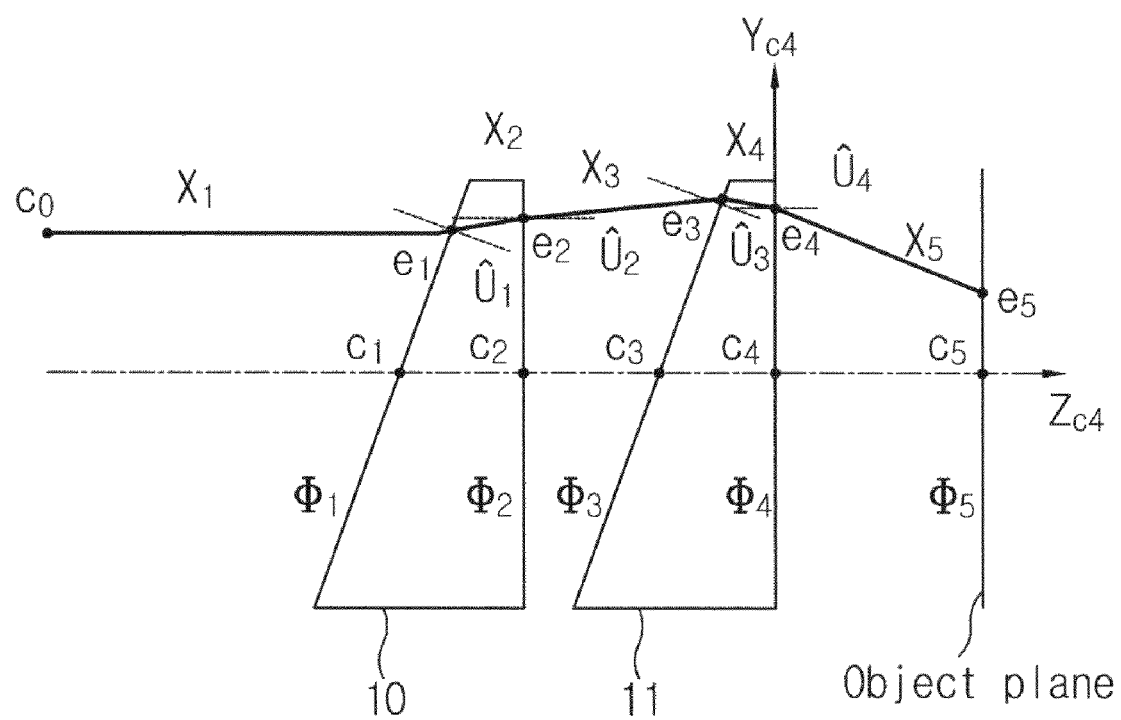
FIG. 8 is the ray tracing diagram for the double wedge prisms.

The ray tracing of the wedge prisms is shown in FIG. 8. By applying ray tracing through each surface, the final azimuth angle γ, zenith angle φ, and the view position ($x_w$, $y_w$) can be determined by the following equations:

$$\phi = \cos^{-1}(X_5(3)); \gamma = \pi - a\tan 2(X_5(1), X_5(2));$$

$$x_w = -e_5(1), y_w = e_5(2). \quad (4)$$

where $X_5$ is the vector of ray between the last surface of the second wedge prism 11 and the object plane. $e_5$ is the cross point between $X_5$ and the object plane.

In actual operation of the system, determination of joint variables given the position and orientation of view is more important. The relationship between the joint space and working space is nonlinear and complex. An analytical inverse relationship is difficult to obtain. Therefore a numerical solution to inverse kinematics is applied in the present invention. The Jacobian of the system can be divided to four parts as shown as follows:

$$J = \begin{bmatrix} J_A & J_B \\ 0 & J_D \end{bmatrix} \quad (5)$$

where $J_A = \begin{bmatrix} \frac{\partial f_x}{\partial x_s} & \frac{\partial f_x}{\partial y_s} \\ \frac{\partial f_y}{\partial x_s} & \frac{\partial f_y}{\partial y_s} \end{bmatrix}$, $J_B = \begin{bmatrix} \frac{\partial f_x}{\partial \theta_{p1}} & \frac{\partial f_x}{\partial \theta_{p2}} \\ \frac{\partial f_y}{\partial \theta_{p1}} & \frac{\partial f_y}{\partial \theta_{p2}} \end{bmatrix}$, $$J_D = \begin{bmatrix} \frac{\partial f_\gamma}{\partial \theta_{p1}} & \frac{\partial f_\gamma}{\partial \theta_{p2}} \\ \frac{\partial f_\varphi}{\partial \theta_{p1}} & \frac{\partial f_\varphi}{\partial \theta_{p2}} \end{bmatrix}.$$

Because of the decoupled design, the inverse Jacobian can be expressed as:

$$J^{-1} = \begin{bmatrix} J_A^{-1} & -J_A^{-1} J_B J_D^{-1} \\ 0 & J_D^{-1} \end{bmatrix} \quad (6)$$

The inverse kinematics algorithm is shown as follows:

(1) Desired working space variable is set as $V_d = [x_{w,d} \; y_{w,d} \; \gamma_d \; \phi_d]'$.

(2) Initial joint variables are $P_0 = [x_s \; y_s \; \theta_{p1} \; \theta_{p2}]^T_0$.

(3) Calculate J at $P_i$.

(4) Update $P_{i+1}$ by the following equations:

$$\begin{bmatrix} \theta_{p1} \\ \theta_{p2} \end{bmatrix}_{i+1} = \begin{bmatrix} \theta_{p1} \\ \theta_{p2} \end{bmatrix}_i + \lambda_r J_D^+ \left( \begin{bmatrix} \gamma_d \\ \varphi_d \end{bmatrix} - \begin{bmatrix} f_\gamma(P_i) \\ f_\varphi(P_i) \end{bmatrix} \right)$$

where $$J_D^+ = J_D^T (J_D J_D^T + \delta I)^{-1}$$

$$\begin{bmatrix} x_s \\ y_s \end{bmatrix}_{i+1} = \begin{bmatrix} x_s \\ y_s \end{bmatrix}_i + \lambda_t J_t^+ \left( V_d - \begin{bmatrix} f_x(P_i) \\ f_y(P_i) \\ f_\gamma(P_i) \\ f_\varphi(P_i) \end{bmatrix} \right)$$

where $$J_t^+ = [\; J_A^{-1} \quad -J_A^{-1} J_B J_D^{-1} \;]$$

where $\lambda_r$ and $\lambda_t$ are the gain factors. δ is the damping factor. $\delta = \delta_0 (1-\omega/\omega_0)^2$, if $\omega < \omega_0$; otherwise, $\delta = 0$, where $\omega = \sqrt{\det(JJ^T)}$.

(5) If $V_d - F(P_{i+1}) < \epsilon$, then $P_i$ is the result, else go to (3).

Figure 9:
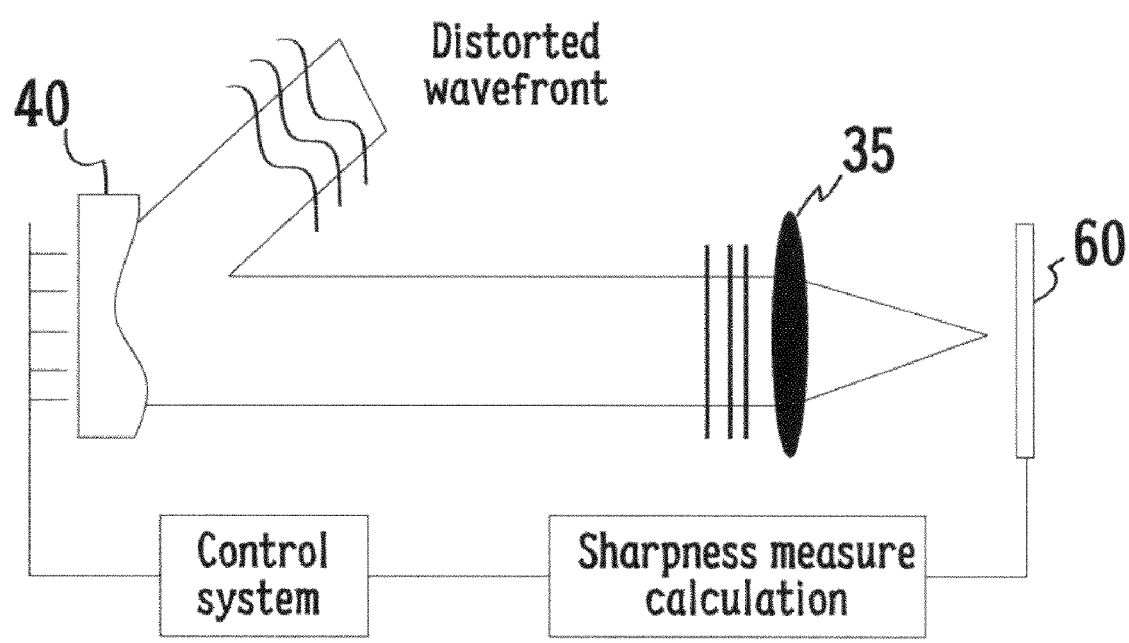
FIG. 9 is the adaptive optics diagram used in the system.

Although the integration of active components in the present invention can achieve new functions, it also introduces aberrations that can degrade the quality of the image. In the present invention, a deformable mirror device 40 is applied to correct the aberration. Instead of using a wavefront sensor, the system calculates the focus measure of the image captured from the camera. The control system uses focus measure as metric to represent the aberration of the image. The control signal is generated to change the surface of the deformable mirror iteratively during operation. As can be seen, because no wavefront sensor or laser source is used, the present invention becomes simple and robust to different kind of targets. The control diagram is shown in FIG. 9.

Figure 10:
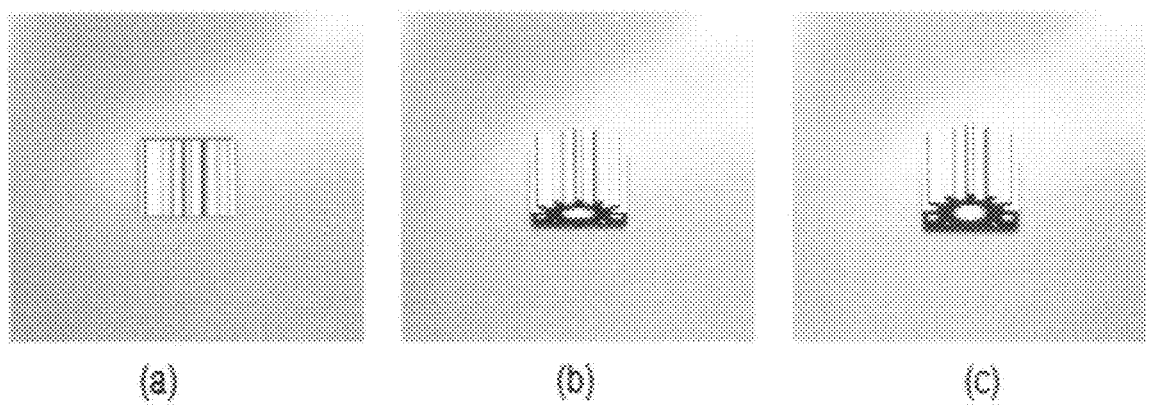
FIG. 10 shows the simulation result for comparison of the present invention and the system with coupled design.

In order to compare the present invention with the earlier approach with the coupled design, one simulation result is shown in FIG. 10. Both systems apply double wedge prisms with 18° 8' vertex angle. In the initial state, the top view of micro gear can be achieved from both systems. FIG. 10 (a) shows the top view of a micro gear. Because of self-occlusion, the hole in the gear cannot be observed. In order to observe the hole in the gear, a view with maximum zenith angle needs to be achieved. The current system can change the zenith angle φ up to 18.9°. The captured image is shown in FIG. 10 (b), where the hole in the gear can be observed. However, the earlier approach with the coupled design can only achieve the zenith angle φ up to 13.8°. The captured image is shown in FIG. 10 (c). As can be seen, a larger area of interest is achieved in the present system.

Figure 11:
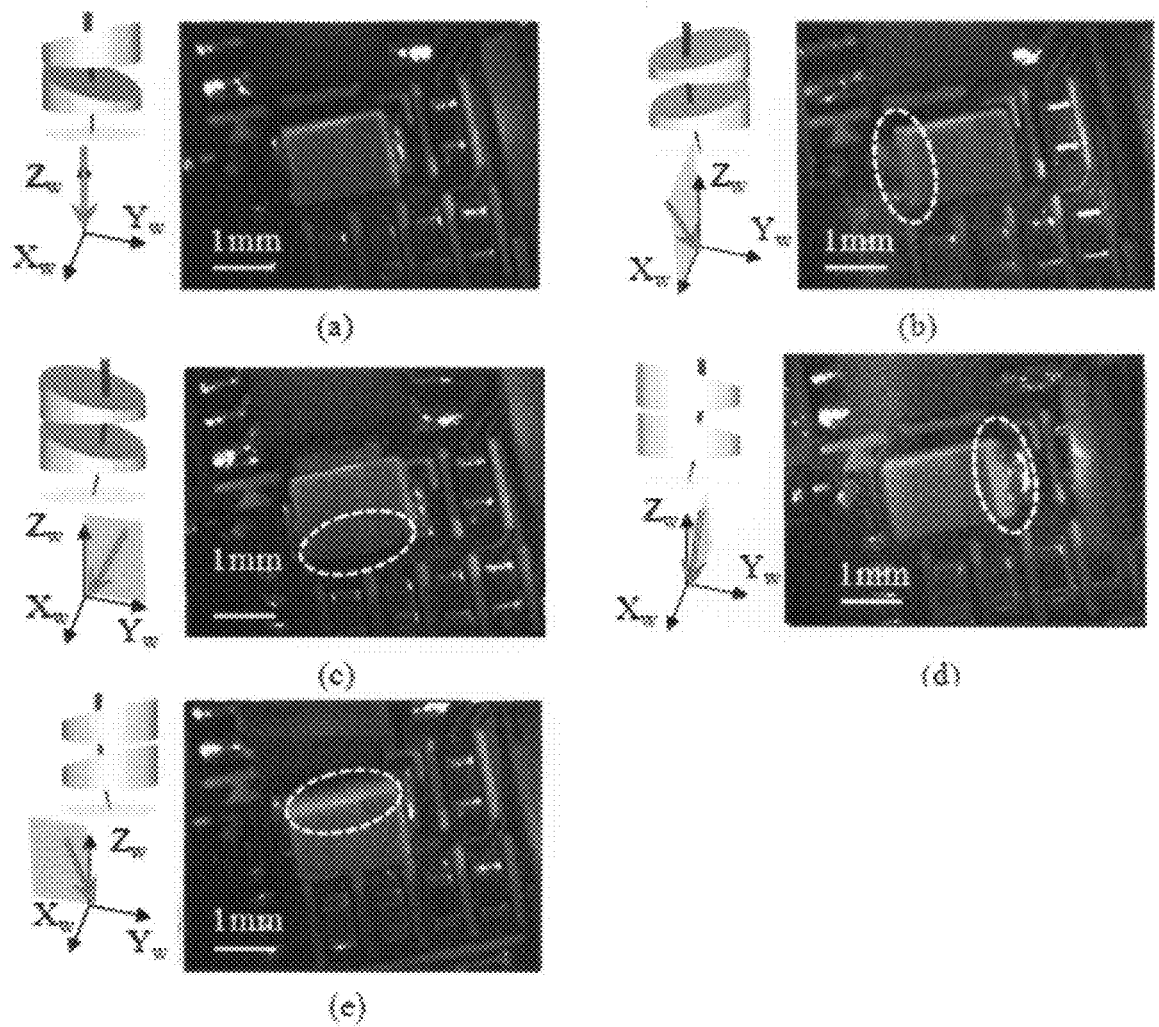
FIG. 11 shows the multi views of a micro chip in five different directions.

The ability of the present invention to change the view without moving the object was tested using multi views of a micro chip. The top view of the micro chip is shown in FIG. 11(a), when $\theta_{sx}=0°$, $\theta_{sy}=-0.37°$, $\theta_{r1}=180°$ and $\theta_{r2}=0°$. The zenith angle φ is 0.43°. The side of the chip cannot be observed due to self-occlusion. Using a conventional optical system, it is difficult to observe every side of an object. However, in the present invention, by changing the configuration of the prisms and the scanning mirror, images with a different zenith angle φ and azimuth angle γ can be achieved. FIG. 11(b) shows the view with a zenith angle φ=18.9° and an azimuth angle γ=0° when $\theta_{sx}=-1.16°$, $\theta_{sy}=0°$, $\theta_{r1}=90°$ and $\theta_{r2}=90°$. The left side of the chip and the solder joint can be observed. FIG. 11(c) shows the view with a zenith angle φ=18.9° and an azimuth angle γ=90° when $\theta_{sx}=0°$, $\theta_{sy}=1.28°$, $\theta_{r1}=0°$ and $\theta_{r2}=0°$. FIG. 11(d) shows the view with a zenith angle φ=18.9° and an azimuth angle γ=270° when $\theta_{sx}=1.16°$, $\theta_{sy}=0°$, $\theta_{r1}=-90°$ and $\theta_{r2}=-90°$. FIG. 11(e) shows the view with a zenith angle φ=18.9° and an azimuth angle γ=270° when $\theta_{sx}=0°$, $\theta_{sy}=-1.28°$, $\theta_{r1}=-180°$ and $\theta_{r2}=-180°$. The dash lines indicate that every side of the chip can be observed with a different configuration of the wedge prisms and the scanning mirror.

As can be seen, the present invention can obtain more vision information compared to a conventional optical system. As the scanning mirror also changes the zenith angle, the maximal zenith angle is different at different view positions.

Figure 12:
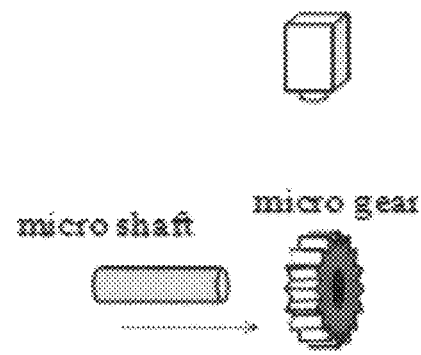
FIG. 12 shows the microassembly experiment result using the present invention.
Figure 12:
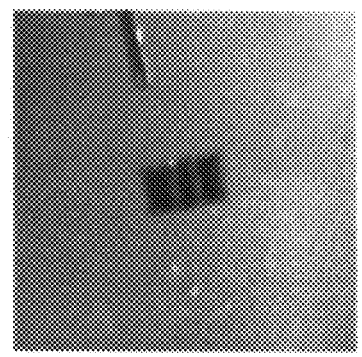
Figure 12:
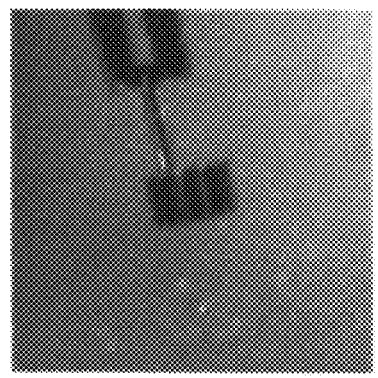
Figure 12:
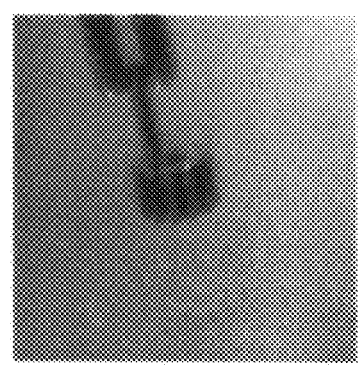
Figure 12:
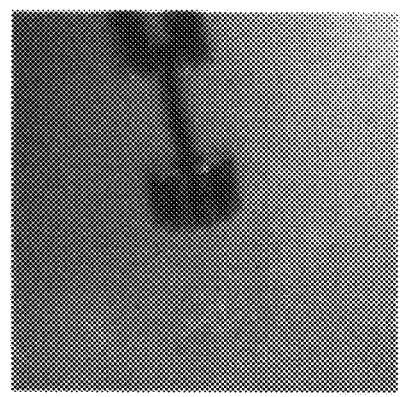
Figure 12:
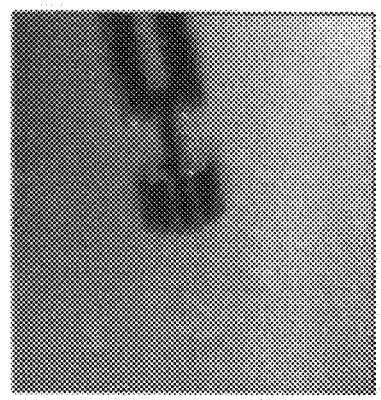

A microassembly application is shown in FIG. 12. The micro shaft needs to be inserted into the hole of the micro gear as shown in FIG. 12 (a). FIG. 12 (b) shows the top view of the micro gear and micro shaft. From the top view, the micro shaft can be moved near the micro gear first as shown in FIG. 12 (c). However, it is impossible to make an insertion without information about the hole in the gear. With the present invention, the system can change the zenith angle and azimuth angle of view to 18.9° and −90°. The captured image in this configuration is shown in FIG. 12 (d). Then, the micro shaft can be aligned with the hole as shown in FIG. 12 (e).

The present system has a simple kinematics. The inverse kinematics is easy to get a solution, which is important for automation of the system. The zenith angle of view can achieve a large value compared to the previous system, which can provide more vision information when occlusion happens.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A system for variable view imaging of micro objects that can supply a view direction, and a spatial position of view without moving a specimen, the system comprising:
   double wedge prisms configured to steer a zenith angle and an azimuth angle of view;
   a telecentric scanner configured to steer the spatial position of view;
   an adaptive optical element for correction of an aberration induced by other optical elements;
   a final image optical element configured to form an image at a final image plane;
   additional image optical elements configured to condition light for the adaptive optical element and for the final image plane; and
   a computer configured to calculate forward kinematics by ray tracing through each of the double wedge prisms, compute a Jacobian matrix from the forward kinematics, and calculate a desired joint parameter for a desired view state iteratively based on the Jacobian matrix of the system.

2. The system for variable view imaging of micro objects according to claim 1, wherein the telecentric scanner includes a mirror scanner and a telecentric lens group.

3. The system for variable view imaging of micro objects according to claim 1, wherein the telecentric scanner is configured to produce a light ray between the telecentric scanner and the double wedge prisms parallel to an optical axis.

4. The system for variable view imaging of micro objects according to claim 2, wherein the mirror scanner comprises one or more mirror surfaces, wherein each of the one or more mirror surfaces is one of, a flat reflecting surface or a curved reflecting surface.

5. The system for variable view imaging of micro objects according to claim 2, wherein a distance between the mirror scanner and the telecentric lens group is determined by minimizing a telecentric angle of the light after the telecentric lens group and the aberration induced by the telecentric lens group for a different field.

6. The system for variable view imaging of micro objects according to claim 1, wherein the adaptive optical element comprises at least one of: a deformable mirror, a spatial light modulator or a deformable lens.

7. The system for variable view imaging of micro objects according to claim 1, further comprising an image sensor located behind the final image optical element to receive the light at the final image plane, wherein the image sensor includes one of: a charged coupled device, a CMOS sensor or an eyepiece for human observation.

8. The system for variable view imaging of micro objects according to claim 1, further comprising a system aperture stop configured to determine ray bundles arriving at the final image plane.

9. A method for operation of a system for variable view imaging of micro objects that can supply a view direction, and a spatial position of view without moving a specimen, the system comprising:
   double wedge prisms configured to steer a zenith angle and an azimuth angle of view;
   a telecentric scanner configured to steer the spatial position of view;
   an adaptive optical element for correction of an aberration induced by other optical elements;
   a final image optical element configured to form an image at a final image plane; and
   additional image optical elements configured to condition light for the adaptive optical element and for the final image plane, the method comprising:
   calculating forward kinematics by ray tracing through each of the double wedge prisms;
   computing a Jacobian matrix from the forward kinematics; and
   calculating a desired joint parameter for a desired view state iteratively based on the Jacobian matrix of the system.

10. A system for variable view imaging of micro objects that can supply a view direction, and a spatial position of view, without moving a specimen, the system comprising:
    double wedge prisms configured to steer a zenith angle and an azimuth angle of view;
    a telecentric scanner configured to steer the spatial position of view, the telecentric scanner including a two axis scanner mirror with two flat surfaces and a telecentric lens group;
    a deformable mirror for correction of an aberration induced by other optical elements;
    a final image optical element to form an image at a final image plane;
    an image sensor located at the final image plane to obtain a final image;
    a system aperture stop configured to determine ray bundles arriving at the final image plane;
    additional image optical elements including one optical element configured to form an intermediate image, two optical elements configured to integrate the deformable mirror in the system, and optical elements configured to relay an active aperture of the deformable mirror to the system aperture stop; and
    a computer configured to calculate forward kinematics by ray tracing through each of the double wedge prisms, compute a Jacobian matrix from the forward kinematics, and calculate a desired joint parameter for a desired view state iteratively based on the Jacobian matrix of the system.

11. The system for variable view imaging of micro objects according to claim 10, wherein the telecentric scanner is configured to make a light ray between the telecentric scanner and the double wedge prisms parallel to an optical axis.

12. The system for variable view imaging of micro objects according to claim 10, wherein the image sensor comprises one of: a charged coupled device, a CMOS sensor, or an eyepiece for human observation.

13. The system for variable view imaging of micro objects according to claim 10, wherein a distance between the two axis scanner mirror and the telecentric lens group is determined by minimizing a telecentric angle of a beam after the telecentric lens group and the aberration induced by the telecentric lens group for a different field.

14. A method for operation of a system for variable view imaging of micro objects that can supply a view direction, and a spatial position of view, without moving a specimen, the system comprising:
   double wedge prisms configured to steer a zenith angle and an azimuth angle of view;
   a telecentric scanner configured to steer the spatial position of view, the telecentric scanner including a two axis scanner mirror with two flat surfaces and a telecentric lens group;
   a deformable mirror for correction of an aberration induced by other optical elements;
   a final image optics element to form an image at a final image plane;
   an image sensor located at the final image plane to obtain a final image;
   a system aperture stop configured to determine ray bundles arriving at the final image plane; and
   additional image optical elements including one optical element configured to form an intermediate image, two optical elements configured to integrate the deformable mirror in the system, and optical elements configured to relay an active aperture of the deformable mirror to the system aperture stop, the method comprising:
   calculating forward kinematics by ray tracing through each of the double wedge prisms;
   computing a Jacobian matrix from the forward kinematics; and
   calculating a desired joint parameter for a desired view state iteratively based on the Jacobian matrix of the system.

* * * * *